Aug. 22, 1939.    T. N. PIERSON    2,170,572
CLUTCH OPERATING MECHANISM
Filed Oct. 18, 1937
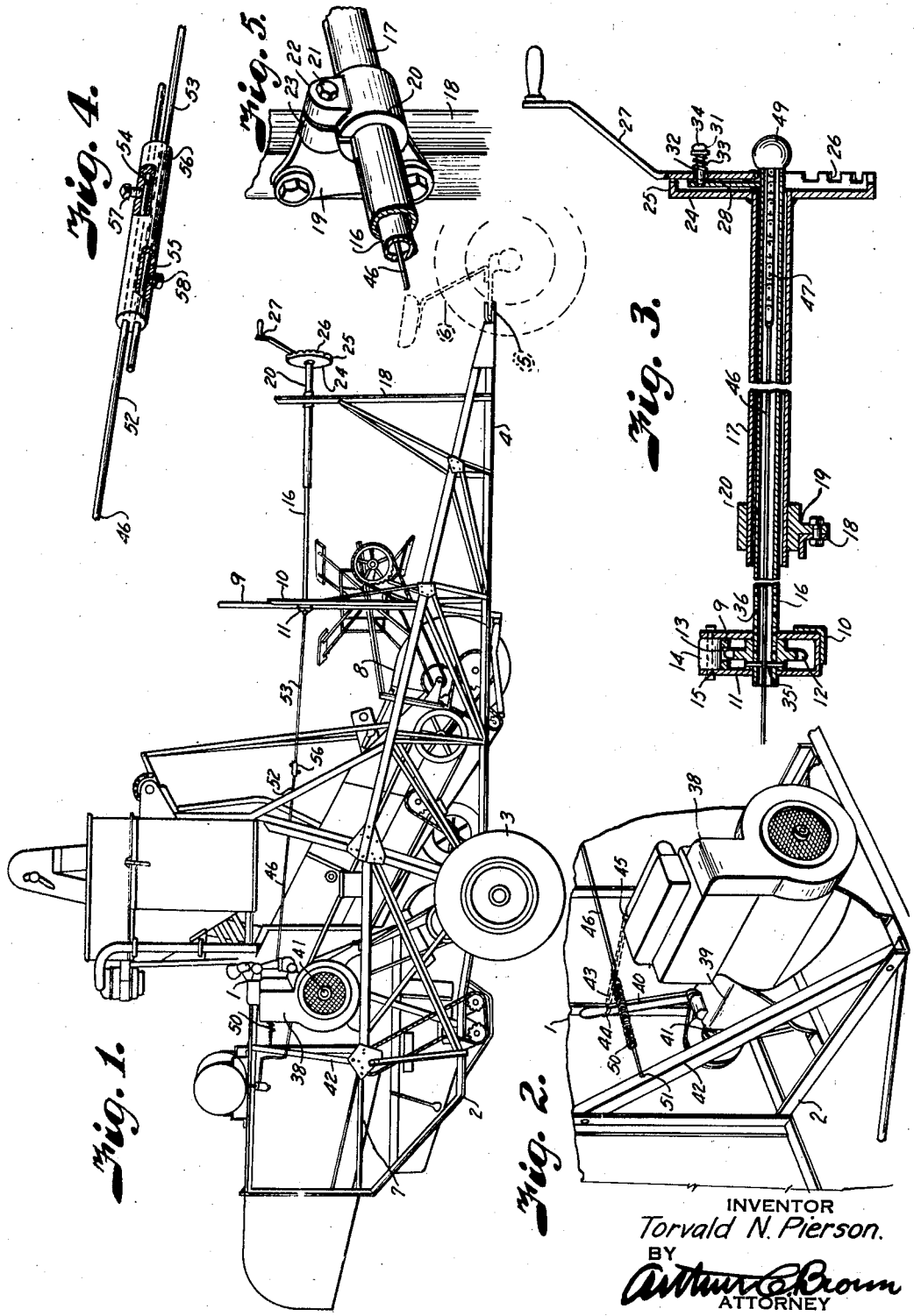
INVENTOR
*Torvald N. Pierson.*
BY
*Arthur E. Brown*
ATTORNEY Patented Aug. 22, 1939

2,170,572

UNITED STATES PATENT OFFICE 2,170,572

CLUTCH OPERATING MECHANISM

Torvald N. Pierson, Independence, Mo., assignor to Gleaner Harvester Corporation, Independence, Mo., a corporation of Delaware Application October 18, 1937, Serial No. 169,621

5 Claims. (Cl. 56—20)

This invention relates to clutch operating mechanisms for combine harvesters and like machines to effect disengagement of the driving connection between the operating mechanism of the machine and its actuating motor. In small machines of this character it is desirable that they should be under control of the tractor operator so that the machine, as well as the tractor, may be controlled by a single operator.

It is, therefore, a principal object of the present invention to provide a clutch operating mechanism adapted for remote control by the operator of the tractor.

Other important objects of the invention are to provide a remote control for the clutch that is readily adjusted relatively to the operator's position on the tractor; and to provide a clutch operating mechanism in association with the mechanism which raises and lowers the harvesting unit of the machine.

In accomplishing these and other objects of the invention, as hereinafter pointed out, I have provided improved details of structure, the preferred form of which is illustrated in the accompanying drawing, wherein:

Fig. 1 is a side elevational view of a combine harvester equipped with a clutch operating mechanism embodying the features of the present invention.

Fig. 2 is a detail perspective view of the motor which actuates the operating mechanism of the machine, and particularly illustrating connection of the clutch lever with its control mechanism.

Fig. 3 is a detail longitudinal section through the shaft and its support for raising and lowering the harvesting unit, and showing the cooperative relation of the clutch control mechanism.

Fig. 4 is a detail perspective view of the coupling for effecting adjustment in the length of the operating cable of the clutch control mechanism.

Fig. 5 is a perspective view of the bracket for supporting the extension housing of the shaft which raises and lowers the harvesting unit.

Referring more in detail to the drawing:

1 designates a combine harvester, including a main frame 2 that is supported on wheels 3 and which has a forwardly extending truss-like tongue 4 adapted for support upon the draw bar 5 of a tractor 6. Supported on the frame 2 is the usual threshing and separating mechanism indicated by the housing 7, and adjustably connected therewith is the harvesting unit 8 that is adapted to be raised or lowered relatively to the frame 2 by means of a rack bar 9.

The rack bar 9 is guidingly supported upon a post 10 that is carried upon the tongue 4, and which has a U-shaped bracket 11 through which the upper end of the bar projects in guiding relation to a gear 12, the bar being provided with suitable apertures 13 forming teeth engaging with the teeth of the gear. The bar is retained in engagement with the gear by a roller 14 that is mounted on a shaft 15 having its ends journaled in the side arms of the bracket. The gear 12 is adjustably fixed on a tubular shaft 16, slidably and rotatably journaled in the bracket 11, as clearly shown in Fig. 3. The other end of the shaft is rotatable within a forwardly projecting tubular housing 17, which has its rear end adjustably anchored to a supporting post 18 that is located adjacent the end of the tongue 4, and which carries a clamp bracket 19 having a slotted bearing portion 20 adapted to be drawn into clamping contact with the tubular housing 17 by a draw bolt 21 that extends through an ear 22 on the bracket and into a threaded socket in an aligning ear 23, as best shown in Fig. 5. The opposite end of the tube 17 projects forwardly of the tongue in the direction of the seat on the tractor, and carries a concentric disk 24, having a forwardly extending peripheral flange 25 provided with a series of notches 26 to be engaged by an actuating crank 27. The shaft 16 projects from the forward end of the tube 17 and carries a fixed arm 28 that is adapted to rotate against the forward face of the disk 24, in coupling relation with the crank 27.

The crank 27 is pivotally supported, as at 29, on the arm 28 so that the shank 30 thereof is adapted to engage and disengage the notches 26. The shank of the crank is connected with the outer end of the arm 28 by means of a pin 31 threaded into the arm and extending through an enlarged opening 32 in the shank of the crank. Sleeved on the pin is a coil spring 33, having one end bearing against the crank and its other end against a head 34 on the pin to normally retain the shank of the crank in engagement with one of the notches 26, but which permits withdrawal of the crank from the notch for rotation about the axis of the disk. Upon rotating the crank, the shaft 16 is actuated to rotate the gear 12 and effect reciprocation of the rack bar 9, which results in raising and lowering of the harvesting unit. The gear 12 is adjustably fixed to the shaft 16 by means of a pin 35 that extends through the hub of the gear and through one of a series of openings 36 that are provided in the rear end of the shaft, as shown in Fig. 3. The crank 27 is adjusted in convenient reach of the operator's seat on the tractor 6, by loosening the bolt 21 and removing the pin 35. The tubular housing 17 and shaft 16 may then be slid relatively to the posts 19 and 18 until the handle 27 is in desired relation to the seat of the tractor. During movement of the shaft 16, the rear end thereof slides through the hub of the gear 12 and the rear end of the tube 17 slides through the clamp bracket. When the adjustment is effected the pin 35 is again inserted through the hub of the gear 12 and through the nearest of the openings 36. The bolt 21 is then tightened to again clamp the tube 17 in fixed position.

Carried on the rear end of the frame 2, at the side of the housing 7, is a motor 38 having a clutch indicated by the housing 39, and which is operated by a lever 40 that is adapted to swing transversely of the forward direction of the machine to engage and disengage the clutch. When the lever 40 is nearest the housing 7 the clutch is in engaged position, and when swung in the direction of the motor it is in disengaged position. The clutch 39 controls a driven shaft 41, having driving connection with the operating mechanism of the machine, as in conventional practice. Located to the rear of the motor 38 is a brace 42 that connects an outer member of the frame 2 with the frame of the housing 7, as best shown in Fig. 2.

The clutch control mechanism, which embodies the features of the present invention, includes a flexible member, such as a chain 43, having one end 44 fixed to the clutch lever 40 and its opposite end fixed to a part of the motor, as indicated at 45. Connected with the intermediate portion of the flexible connection 43 is a cable 46, extending forwardly of the machine and through the tubular shaft 16 to connect with a chain 47 having a knob 49, which normally engages the forward end of the shaft as shown in Fig. 3. The knob 49 is retained in engagement with the end of the shaft by a coil spring 50, having one end attached to the link which connects with the cable 46 and its other end hooked in an opening 51 in the brace 42 as shown in Fig. 2. The spring 50 thus retains the cable 46 in taut condition. In order to adjust the length of the cable upon adjustment of the shaft 16, the cable is formed of two sections 52 and 53, having their ends extending through parallel bores 54 and 55 in a coupling 56, the ends of the cable sections being adjustably secured in the bores by set screws 57 and 58 as shown in Fig. 4. When the parts are to be adjusted, the set screws 57 and 58 are loosened, then after adjustment of the shaft 16 the cable sections are drawn taut and the set screws are retightened.

When the operator desires to disengage the clutch, he grasps the knob 49 and pulls on the cable 46, which causes the intermediate portion of the flexible connection 43 to be drawn forwardly of the machine, and since one end thereof is attached to the motor, the opposite end pulls on the clutch lever to effect disengagement of the clutch. During this movement of the cable, the spring 50 is tensioned so that when the knob 49 is released the spring returns the cable and draws the knob into engagement with the forward end of the tubular shaft 16, however, slack remains in the flexible connection 43 so that the clutch lever stays in disengaged position. To reengage the clutch it is necessary for the operator to leave his seat and manually throw the lever 40 into engaged position. This does not detract from the usefulness of the invention because the clutch is disengaged only when the harvesting machine is not operating properly and requires the inspection of the operator. After the inspection or repairs, the clutch may be returned to its engaged position before the operator again resumes his seat on the tractor.

From the foregoing it is apparent that I have provided a remote control clutch operating mechanism for tractors and similar machines, wherein the clutch of the actuating motor may be readily operated from the seat of the tractor. It is also obvious that the control cable is adjustable according to the adjustment of the harvester raising and lowering mechanism, so that the clutch control and raising and lowering mechanism may be associated in a single unit with the controls thereof in convenient reach of the operator.

What I claim and desire to secure by Letters Patent is:

1. In a combine including a frame having a tongue adapted for connection with a draft vehicle, threshing and separating mechanisms on the frame, a harvesting unit adjustably supported on the frame, a tubular shaft supported on the tongue for raising and lowering the harvesting unit, a motor on the frame for actuating said mechanisms, a clutch connecting the motor with said mechanisms, a lever for actuating the clutch, a cable extending through said tubular shaft, a knob connected with the forward end of the cable, means connecting the cable with said lever, and a spring for maintaining the cable in taut condition with the knob in engagement with said shaft.

2. In a combine including a frame having a tongue adapted for connection with a draft vehicle, threshing and separating mechanisms on the frame, a harvesting unit adjustably supported on the frame, a tubular shaft supported on the tongue for raising and lowering the harvesting unit, a motor on the frame for actuating said mechanisms, a clutch connecting the motor with said mechanisms, a lever for actuating the clutch, a flexible member connecting the lever with a part of the motor, a cable connected with the flexible member and extending through said tubular shaft, a knob connected with the forward end of the cable and normally engaging the end of the shaft, and a spring for maintaining the cable in taut condition with the knob in engagement with said shaft.

3. In a combine including a frame having a tongue adapted for connection with a draft vehicle, threshing and separating mechanisms on the frame, a harvesting unit adjustably supported on the frame, a tubular shaft supported on the tongue for raising and lowering the harvesting unit, said shaft being adjustable on the tongue relatively to the draft vehicle, a motor on the frame for actuating said mechanisms, a clutch connecting the motor with said mechanisms, means for actuating the clutch including a cable section connected with said clutch, a cable section extending through said shaft, a knob on said last named section, and means adjustably connecting said cable sections to compensate for adjustment in said tubular shaft relatively to the draft vehicle.

4. In a combine including a frame having a tongue adapted for connection with a draft vehicle, threshing and separating mechanisms on the frame, a harvesting unit adjustably supported on the frame, a shaft supported on the tongue for raising and lowering the harvesting unit, a motor on the frame for actuating said mechanisms, a clutch connecting the motor with said mechanisms, means for actuating the clutch including a flexible member having one end connected with the clutch and having its other end fixed to a stationary part of the combine whereby said member is in substantially taut condition when the clutch is engaged, a cable connected to the flexible member at a point intermediate its ends and having support by said shaft, a gripping member on the forward end of the cable, and a spring acting to retain the cable in taut condition when the clutch is engaged.

5. In a combine including a frame having a tongue adapted for connection with a draft vehicle, threshing and separating mechanisms on the frame, a harvesting unit adjustably supported on the frame, a shaft supported on the tongue for raising and lowering the harvesting unit, said shaft being adjustable on the tongue relatively to the draft vehicle, a motor on the frame for actuating said mechanisms, a clutch connecting the motor with said mechanisms, means for actuating the clutch including a cable section connected with said clutch, a cable section supported by said shaft, a gripping member on the foremost end of the last named section, and means adjustably connecting said cable sections to compensate for adjustment in said shaft relatively to the draft vehicle.

TORVALD N. PIERSON.